(12) United States Patent
Furubayashi

(10) Patent No.: US 11,381,143 B2
(45) Date of Patent: Jul. 5, 2022

(54) MOTOR

(71) Applicant: NIDEC SANKYO CORPORATION, Nagano (JP)

(72) Inventor: Kazumi Furubayashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 463 days.

(21) Appl. No.: 16/583,481

(22) Filed: Sep. 26, 2019

(65) Prior Publication Data

US 2020/0119627 A1   Apr. 16, 2020

(30) Foreign Application Priority Data

Oct. 12, 2018   (JP) .............................. JP2018-193677

(51) Int. Cl.
*H02K 15/00* (2006.01)
*H02K 15/03* (2006.01)
*H02K 1/04* (2006.01)
*H02K 49/04* (2006.01)
*H02K 1/14* (2006.01)

(52) U.S. Cl.
CPC .............. *H02K 15/03* (2013.01); *H02K 1/04* (2013.01); *H02K 1/145* (2013.01); *H02K 49/043* (2013.01); *H02K 2203/12* (2013.01); *Y10T 29/53143* (2015.01)

(58) Field of Classification Search
CPC ...... H02K 5/225; H02K 5/1672; H02K 16/04; H02K 1/185; H02K 2203/12; H02K 47/20; Y10T 29/53143; Y10T 29/49009; Y10T 29/49208; H01R 2201/10
USPC .......... 29/732, 596, 598, 606, 729, 787, 795
See application file for complete search history.

(56) References Cited

U.S. PATENT DOCUMENTS 4,438,361 A * 3/1984 Manson ............... H02K 5/1732
                                                            310/90
9,692,274 B2 * 6/2017 Furubayashi ............ H02K 5/04

FOREIGN PATENT DOCUMENTS

JP         2018085818 A      5/2018

* cited by examiner

*Primary Examiner* — Thiem D Phan
(74) *Attorney, Agent, or Firm* — Cantor Colburn LLP

(57) ABSTRACT

A motor may include a rotor and a stator. The stator may include first and second stator assemblies. Each stator assembly may include a coil wound around a tube-shaped body part of a bobbin comprising a terminal block; and first and second stator cores disposed on opposite sides of the coil. The first stator cores of the first and second stator assemblies are welded together at outer peripheries of the first stator cores of the first and second stator assemblies. The welded portion may be covered by the terminal block of one of the first stator assembly or the second stator assembly on an outer side in the radial direction with a predetermined space between the welded portion and the terminal block.

7 Claims, 5 Drawing Sheets

MOTOR

CROSS REFERENCE TO RELATED APPLICATION

The present invention claims priority under 35 U.S.C. § 119 to Japanese Patent Application No. 2018-193677 filed Oct. 12, 2018, the entire content of which is incorporated herein by reference.

TECHNICAL FIELD

At least an embodiment of the present invention relates to a motor which has two stator assemblies each of which has a coil and a stator core and, in which a stator faces a rotor magnet on an outer side in a radial direction.

BACKGROUND

Conventionally, as this type of motor, for example, a stepping motor which is disclosed in Japanese Patent Laid-Open No. 2018-85818 (Patent Literature 1) has been known.

A stator in this stepping motor includes a first stator assembly having a coil and a stator core and a second stator assembly having a coil and a stator core and the stator is housed in a case. The case is formed with an opening part through which a terminal block provided in a bobbin around which the coil is wound is protruded to an outer side in a radial direction. A pair of stator cores located at a position close to each other of the first stator assembly and the second stator assembly and the case are fixed to each other in welded portions provided at edges of the opening part or in the vicinity of the opening part on both sides in a circumferential direction of the opening part of the case. Therefore, the case is hard to vibrate near the opening part and generation of noise is restrained.

However, in the conventional motor, the welded portions for fixing a pair of the stator cores to the case are provided so as to be exposed at the edges of the opening part of the case or in the vicinity of the opening part and thus, the welded portions are exposed at positions where a person or an object is capable of touching. Therefore, when the welded portion is touched by a person or an object, the welded portion may be damaged.

SUMMARY

In view of the problem described above, at least an embodiment of the present invention provides a motor including a rotor having a rotation shaft and a rotor magnet held by the rotation shaft, and a stator which faces the rotor magnet on an outer side in a radial direction. The stator includes two stator assemblies, and each of the two stator assemblies includes a coil, which is wound around a tube-shaped body part of a bobbin having a terminal block, and stator cores which are disposed on both sides in a motor axial line direction with respect to the coil. The stator core structuring one of the two stator assemblies which is located on a side of the other stator assembly and the stator core structuring the other stator assembly which is located on a side of the one stator assembly are welded together and fixed to each other in at least one welded portion on their outer peripheries, and the welded portion is covered by the terminal block provided in the bobbin which structures at least one of the two stator assemblies on an outer side in the radial direction with a predetermined space between the welded portion and the terminal block.

According to this structure, a pair of the stator cores located at a position close to each other in the two stator assemblies is fixed at least at one position of the welded portion in their outer peripheries. In addition, the welded portion is covered by at least one of the terminal blocks provided in the bobbins which structure the two stator assemblies on an outer side in the radial direction with a predetermined space therebetweeen. Therefore, at least the welded portion provided at one position and structured to fix a pair of the stator cores to each other is prevented from coming into contact with a person or an object by the terminal block which covers the welded portion on the outer side in the radial direction. Accordingly, in at least the welded portion provided at one position, there is no fear that a person or an object comes into contact with the welded portion to damage the welded portion. As a result, mutual fixing of a pair of the inner stator cores is surely maintained in at least the welded portion provided at one position.

Further, in at least an embodiment of the present invention, a relief part is provided in the stator cores which are welded in the welded portion or in the terminal block which covers the welded portion to provide the predetermined space.

According to this structure, a relief part is provided in the stator cores which are welded or in the terminal block which covers the welded portion and thus, a space in which the welded portion is accommodated and which covers the terminal block is formed by the relief part.

Further, in at least an embodiment of the present invention, the relief part is provided in the stator cores which are welded in the welded portion.

When the relief part is provided in the terminal block, the position providing the terminal block is shifted to an outer side in the radial direction. On the other hand, a protruding amount of the terminal block permitted to be projected to an outer side in the radial direction is limited due to restriction of an outer side dimension of the motor. Therefore, a length in the radial direction of the terminal block is shortened and thus, it is difficult to secure a sufficient press-in margin of a pin around which end parts of a coil wire are bound to the terminal block. However, according to this structure that the relief part is provided in a pair of the stator cores to be welded, the relief parts can be provided without shifting the positions of the terminal blocks to an outer side in the radial direction. Therefore, without projecting the terminal block to an outer side in the radial direction and, while securing a press-in margin of the terminal pin to the terminal block, a space in which the welded portion is accommodated and which is covered by the terminal block can be secured.

Further, in at least an embodiment of the present invention, the relief part is provided so that the outer peripheries of the stator cores welded in the welded portion are recessed deeper than a height of a welded mark which is swellingly formed in the welded portion.

According to this structure, even when a welded mark is swellingly formed in the welded portion, the welded mark is accommodated in a space formed by the relief part. Therefore, a function of the terminal block for preventing a person or an object from coming into contact with the welded portion is secured.

Further, in at least an embodiment of the present invention, the welded portion is covered by the terminal blocks provided in the bobbins which structure the two stator assemblies on the outer side in the radial direction with the predetermined space between the welded portion and the terminal blocks.

According to this structure, the welded portion is covered by a pair of the terminal blocks and thus, an area of the welded portion covered by the terminal blocks is increased and a possibility that a person or an object comes into contact with the welded portion is reduced.

Further, in at least an embodiment of the present invention, the welded portion is provided at a plurality of positions of the outer peripheries of the stator cores.

According to this structure, a pair of the stator cores is welded at a plurality of positions of their outer peripheries and thus, the stator cores are firmly fixed to each other and, even when an impact is applied to the motor, the fixed portion of the stator cores is not damaged easily.

Further, in at least an embodiment of the present invention, the welded portion is provided at two positions, i.e., a position of the outer peripheries of the stator cores covered by the terminal block, and a position of the outer peripheries of the stator cores located point-symmetrical with a motor axial line as a center.

According to this structure, the welded portion is located at two positions point-symmetrical to each other with the motor axial line as a center and thus, the stator cores are firmly and efficiently fixed to each other in fewer welded portions.

Effects of the Invention

According to at least an embodiment of the present invention, a motor is provided which has no fear that the welded portion is damaged caused by a person or an object coming into contact with the welded portion and which is capable of surely maintaining fixing of the stator cores to each other.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment for carrying out the present invention in which a motor in accordance with the present invention is applied to a stepping motor will be described below.

In the following descriptions, in a motor axial line "L" direction, a side to which a rotation shaft 2 is protruded from a stator 5 is referred to as an output side "L1", and an opposite side to the side where the rotation shaft 2 is protruded from the stator 5 is referred to as an anti-output side "L2".

(Entire Structure)

Figure 1:
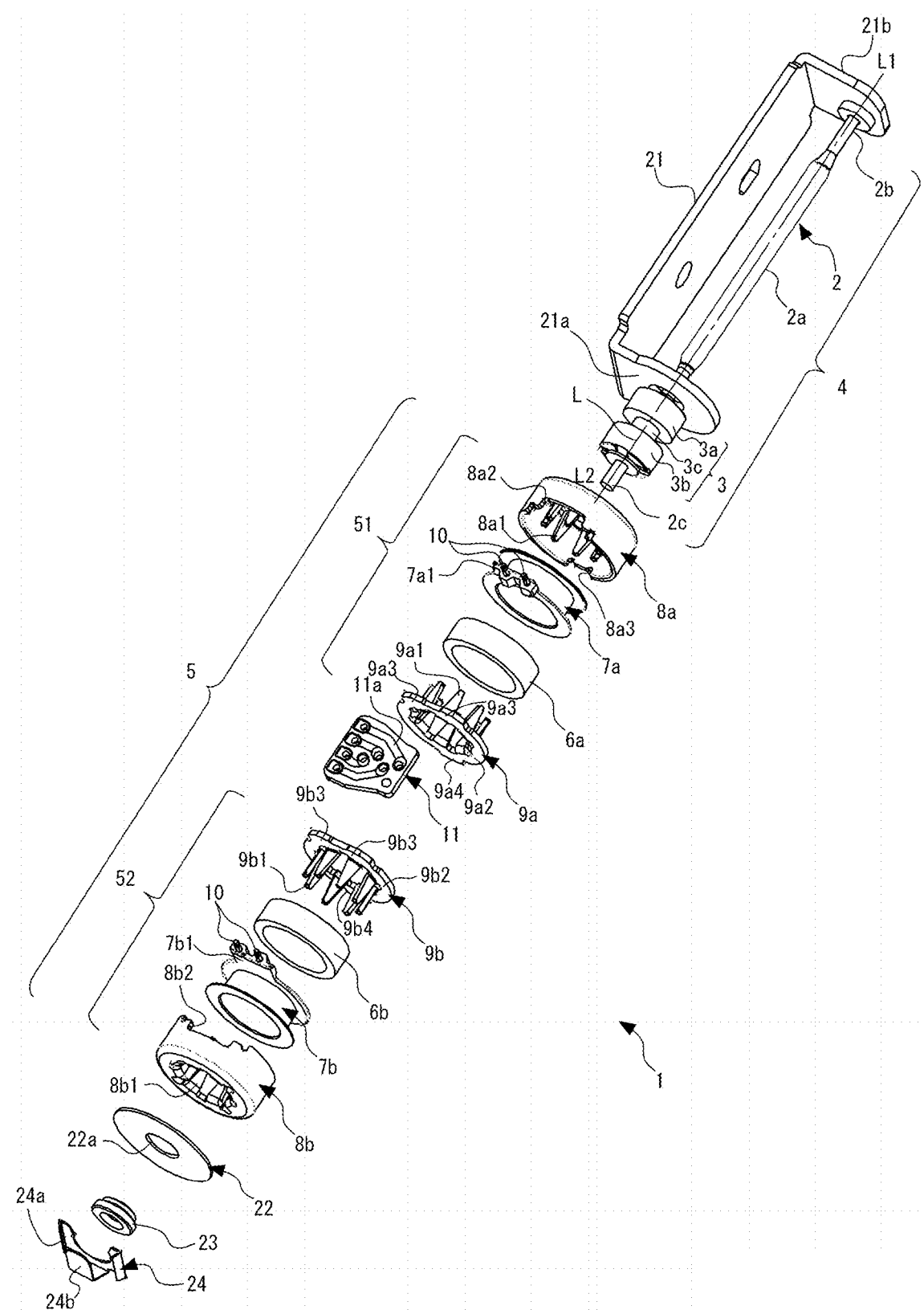
FIG. 1 is an exploded perspective view showing a stepping motor in accordance with an embodiment of the present invention.
Figure 2:
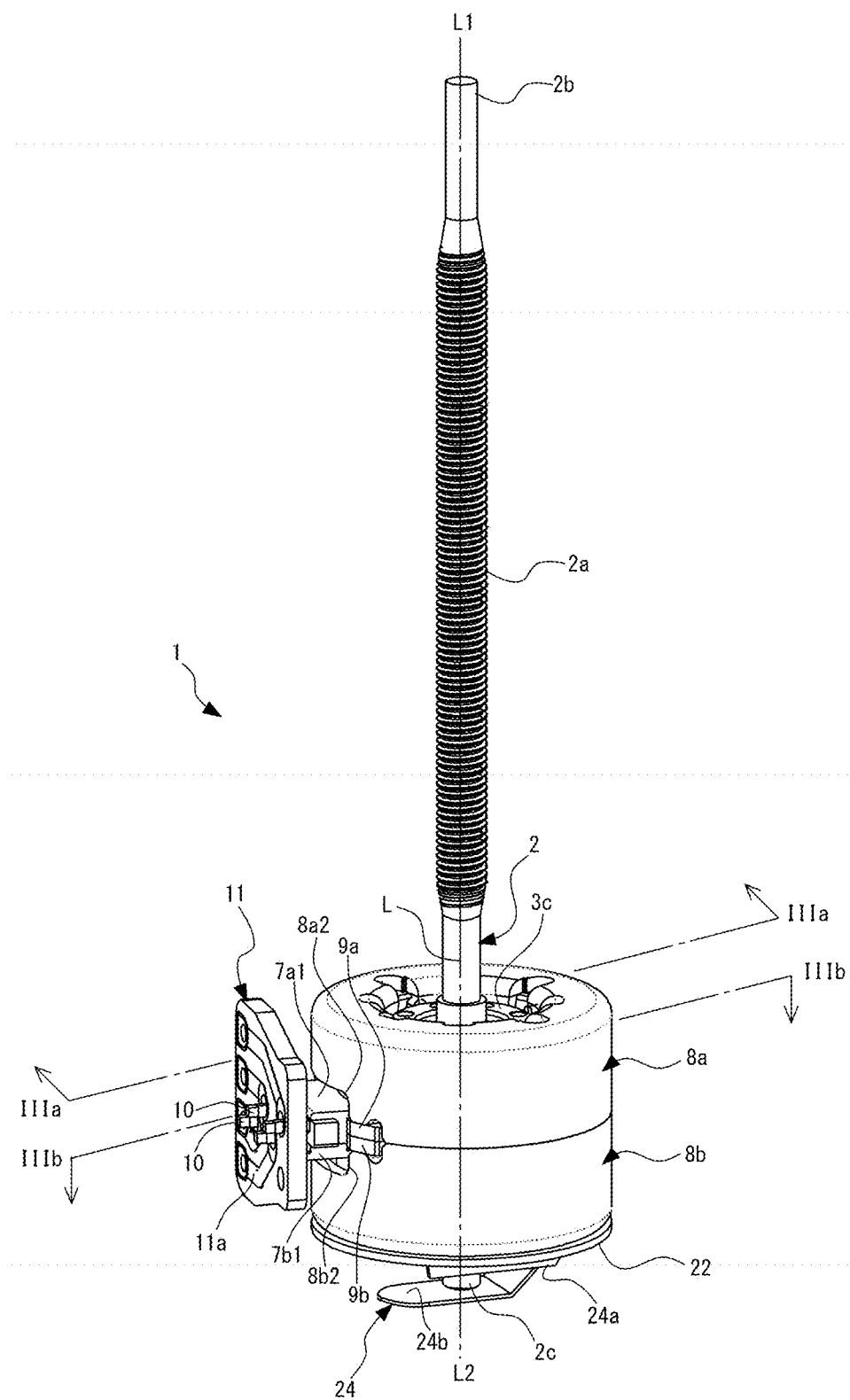
FIG. 2 is an outward perspective view showing a state that a plate is detached from the stepping motor shown in FIG. 1.
Figure 3A:
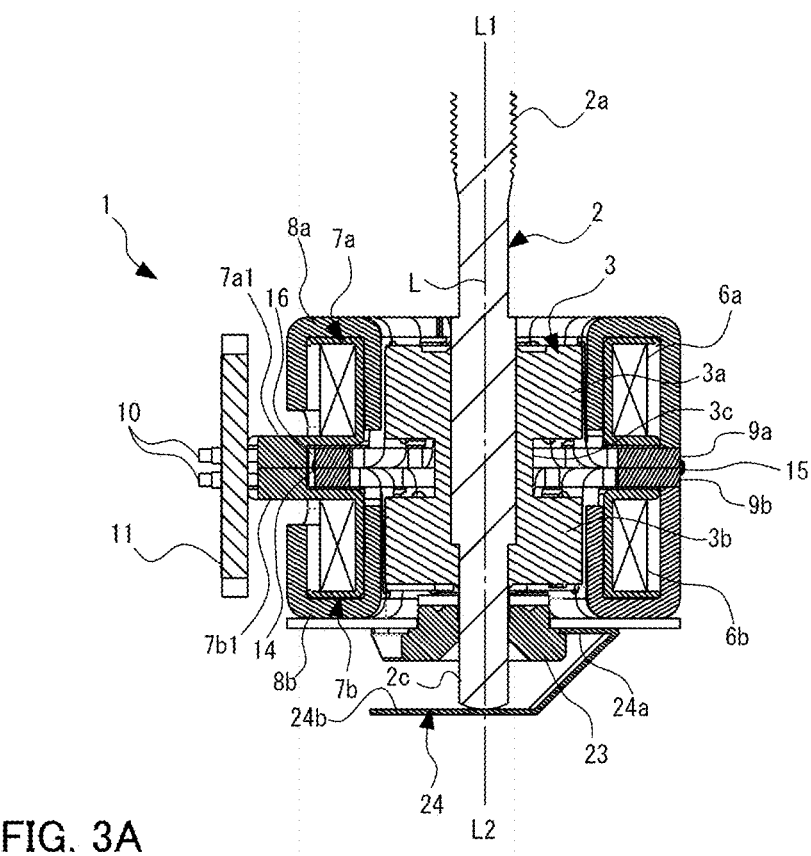
FIG. 3A is a longitudinal cross-sectional view showing the stepping motor in FIG. 1.
Figure 3B:
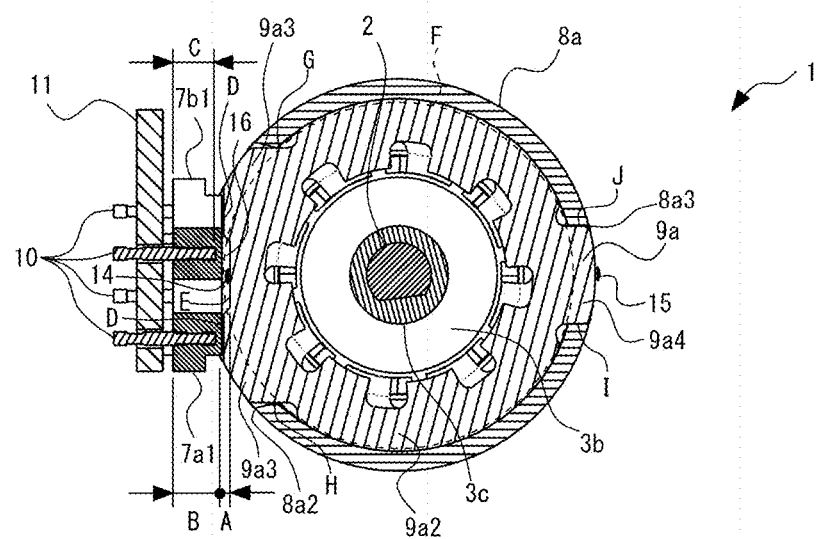
FIG. 3B is its transversal cross-sectional view.

FIG. 1 is an exploded perspective view showing a stepping motor 1 in accordance with an embodiment of the present invention. FIG. 2 is an outward perspective view showing a state that a plate 21 is detached from the stepping motor 1 shown in FIG. 1 and is viewed from the output side "L1". FIG. 3A is a longitudinal cross-sectional view showing the stepping motor 1 in FIG. 2 which is cut by a plane including the motor axial line "L" and the "IIIa-IIIa" line and is viewed in the arrow direction. FIG. 3B is a transversal cross-sectional view showing the stepping motor 1 in FIG. 2 which is cut by a plane perpendicular to the motor axial line "L" and including the "IIIb-IIIb" line and is viewed in the arrow direction.

The stepping motor 1 is, for example, used to drive an optical head in an optical disk drive device such as a DVD or a Blu-ray disk, or to drive a mirror in an HUD (head up display) structured to reflect information with the mirror to project it to a front window of a vehicle. The stepping motor 1 includes a rotor 4 in which a rotor magnet 3 is held by a rotation shaft 2 and a stator 5 which faces the rotor magnet 3 on an outer side in the radial direction.

(Structure of Stator)

The stator 5 is structured so that a first bobbin 7a whose tube-shaped body part is wound around with a coil 6a and a second bobbin 7b whose tube-shaped body part is wound around with a coil 6b are disposed so as to be overlapped with each other in the motor axial line "L" direction. An outer stator core 8a which serves as a case and an inner stator core 9a are disposed in an overlapped manner on both sides in the motor axial line "L" direction of the first bobbin 7a, and an outer stator core 8b which serves as a case and an inner stator core 9b are disposed in an overlapped manner on both sides in the motor axial line "L" direction of the second bobbin 7b. In other words, the stator 5 includes two stator assemblies, i.e., a first stator assembly 51 structured of the coil 6a which is wound around the first bobbin 7a and the outer stator core 8a and the inner stator core 9a which are disposed on both sides in the motor axial line "L" direction with respect to the coil 6a, and a second stator assembly 52 structured of the coil 6b which is wound around the second bobbin 7b and the outer stator core 8b and the inner stator core 9b which are disposed on both sides in the motor axial line "L" direction with respect to the coil 6b.

A plurality of pole teeth 8a1 and 9a1 of the outer stator core 8a and the inner stator core 9a is arranged in a circumferential direction on an inner circumferential face of the tube-shaped body part of the first bobbin 7a. Further, a plurality of pole teeth 8b1 and 9b1 of the outer stator core 8b and the inner stator core 9b is arranged in the circumferential direction on an inner circumferential face of the tube-shaped body part of the second bobbin 7b. The stator 5 is structured in a tube shape, and the rotor 4 is coaxially disposed on an inner side in the radial direction of the stator 5. In this embodiment, the first bobbin 7a and the second bobbin 7b are formed of an insulation member made of resin, and terminal blocks 7a1 and 7b1 are integrally formed in the first bobbin 7a and the second bobbin 7b. Two terminal pins 10 are press-fitted and fixed to each of the terminal blocks 7a1 and 7b1. End parts of a winding start and a winding end of a wire of each of the coils 6a and 6b are respectively bound to the terminal pins 10. The terminal blocks 7a1 and 7b1 are formed at the same angular positions of the bobbins 7a and 7b and, when viewed in the motor axial line "L" direction, the terminal blocks 7a1 and 7b1 are overlapped with each other and are protruded to an outer side of the outer stator cores 8a and 8b through cut-out parts 8a2 and 8b2 respectively formed in the outer stator cores 8a and 8b. Each of the terminal pins 10 press-fitted to the protruded terminal blocks 7a1 and 7b1 is inserted into a hole formed in a wiring circuit board 11 and is electrically connected with a wiring pattern 11a formed in the wiring circuit board 11.

The outer stator cores 8a and 8b and the inner stator cores 9a and 9b are made of magnetic metal and have conductivity. The outer stator cores 8a and 8b are respectively formed with cut-out parts 8a3 and 8b3 (see FIG. 4B described below) smaller than the cut-out parts 8a2 and 8b2 at positions facing the cut-out parts 8a2 and 8b2 so as to interpose the motor axial line "L" therebetween. In the first stator assembly 51 and the second stator assembly 52, the inner stator core 9a structuring the first stator assembly 51 which is one of the two stator assemblies is located on a side of the second stator assembly 52 which is the other of the two stator assemblies. Further, the inner stator core 9b structuring the second stator assembly 52 which is the other of the two stator assemblies is located on a side of the first stator assembly 51 which is the one of the two stator assemblies.

(Structure of Welded Portion)

Figure 4A:
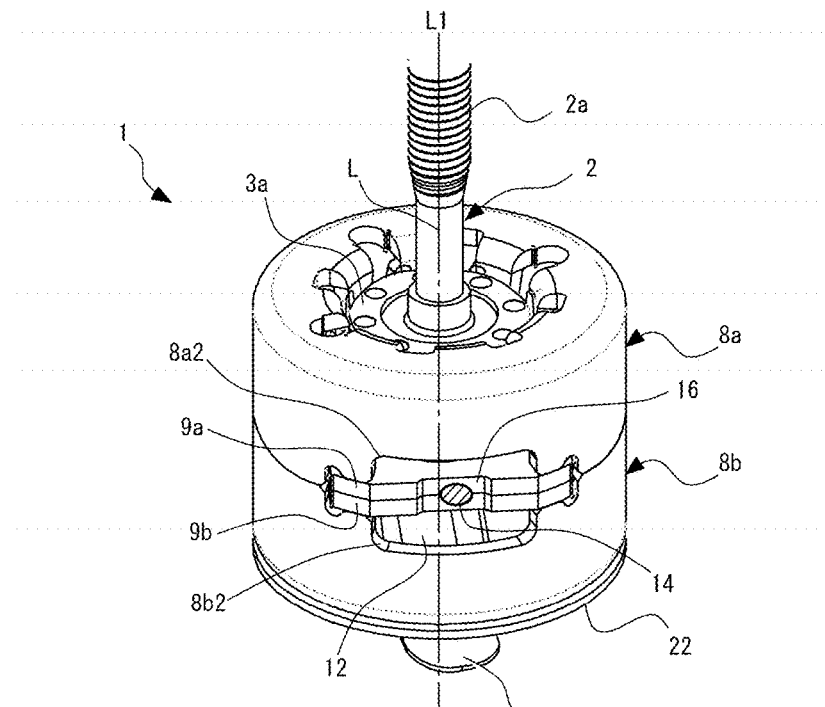
FIG. 4A is an outward perspective view showing a stepping motor in which a wiring circuit board and respective bobbins are not shown in the stepping motor in FIG. 2.
Figure 4B:
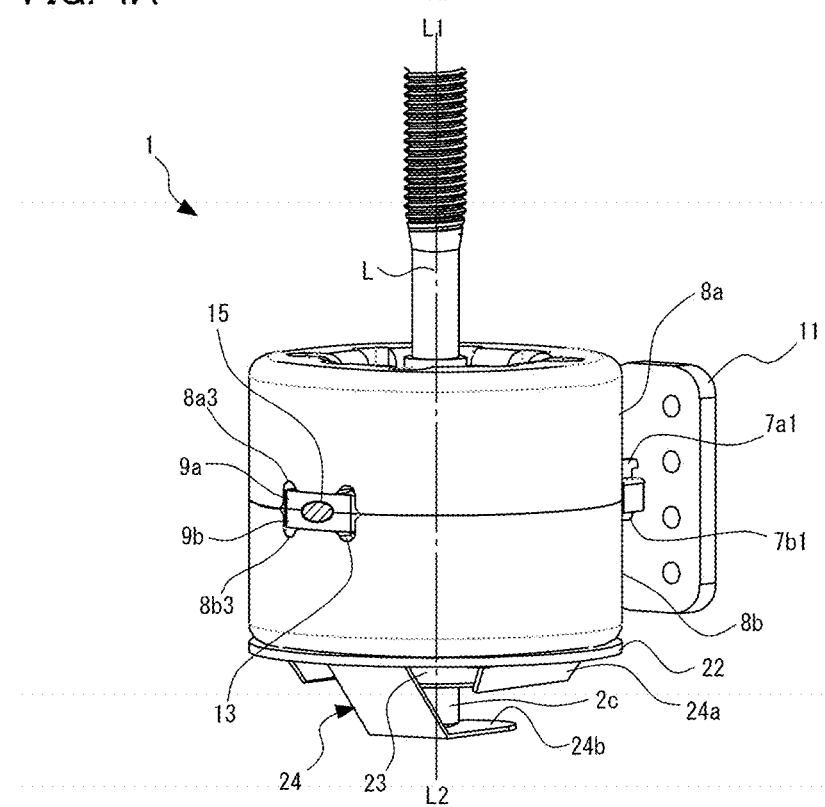
FIG. 4B is an outward perspective view showing the stepping motor in FIG. 2 which is viewed from an opposite side to a side where a wiring circuit board is provided.

Outer peripheries of the inner stator cores 9a and 9b which are disposed at a position close to each other between the first stator assembly 51 and the second stator assembly 52 are welded together and fixed to each other in two welded portions 14 and 15 shown by ellipses with slanted lines in FIG. 4A and FIG. 4B. FIG. 4A is an outward perspective view showing the stepping motor 1 in which the circuit board 11 and the first and the second bobbins 7a and 7b are not shown in the stepping motor 1 in FIG. 2. FIG. 4B is an outward perspective view showing the stepping motor 1 which is viewed from an opposite side to the side where the wiring circuit board 11 is provided in the stepping motor 1 shown in FIG. 2. Further, the outer stator cores 8a and 8b structuring the case are welded together and fixed to each other at appropriate abutting portions of their outer peripheries.

In the two welded portions 14 and 15, the welded portion 14 is, as shown in FIG. 4A, located at substantially a center of a large opening part 12 which is formed by the cut-out parts 8a2 and 8b2 of the cases structured of the outer stator cores 8a and 8b. Further, the other welded portion 15 is, as shown in FIG. 4B, located at an exposed position in a small opening part 13 which is formed by the cut-out parts 8a3 and 8b3 of the cases structured of the outer stator cores 8a and 8b.

Figure 5:
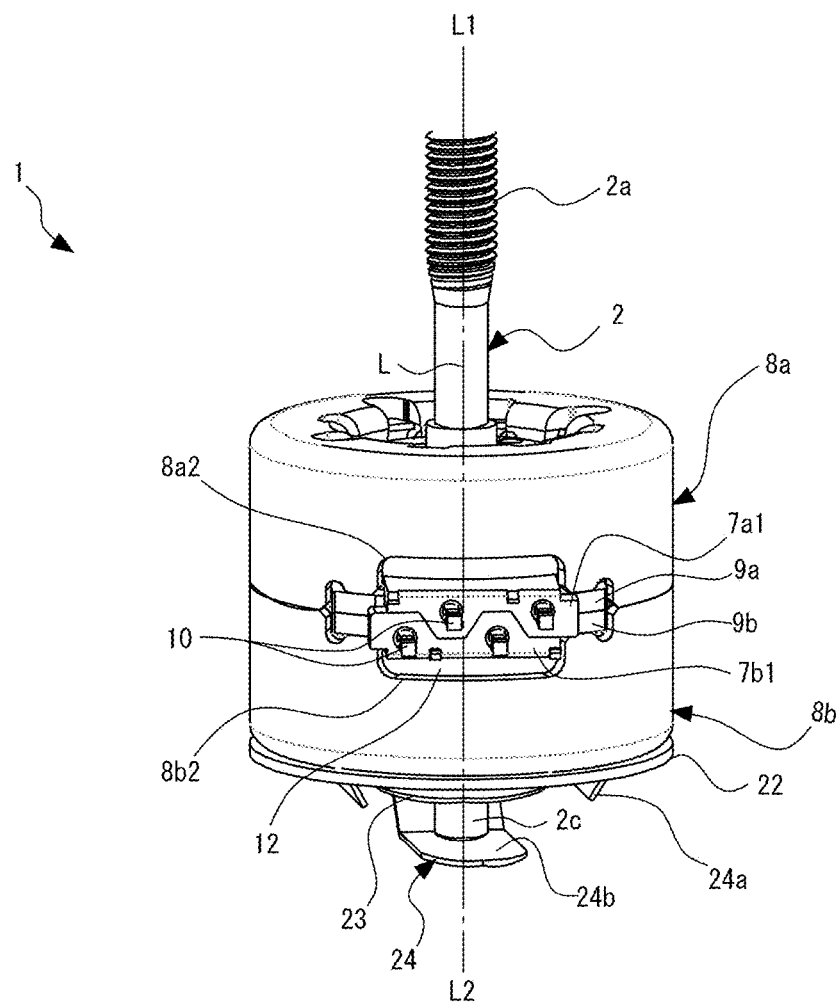
FIG. 5 is an outward perspective view showing a stepping motor in which a wiring circuit board is not shown in the stepping motor in FIG. 2.

In the two welded portions 14 and 15, the welded portion 14 located in the opening part 12 is covered by the terminal block 7a1 or 7b1 provided in the bobbin 7a or 7b structuring at least one of the two stator assemblies 51 and 52 on an outer side in the radial direction with a certain space therebetween. In this embodiment, as shown in FIG. 3A and FIG. 3B and FIG. 5, the welded portion 14 is covered by a pair of the terminal blocks 7a1 and 7b1 provided in the respective bobbins 7a and 7b structuring both of the two stator assemblies 51 and 52 on an outer side in the radial direction with a predetermined space therebetween. FIG. 5 is an outward perspective view showing the stepping motor 1 in which the wiring circuit board 11 is not shown in the stepping motor 1 shown in FIG. 2. The welded portion 15 exposed in the opening part 13 is located at a position point-symmetrical to the welded portion 14 which is covered by the terminal blocks 7a1 and 7b1 with the motor axial line "L" as a center.

The space which accommodates the welded portion 14 and is covered by the terminal blocks 7a1 and 7b1 through a predetermined distance is formed by providing a relief part 16 in a pair of the inner stator cores 9a and 9b to be welded. The relief part 16 is provided in the outer peripheries of a pair of the inner stator cores 9a and 9b so as to be formed in a trapezoid shape which is recessed deeper than a height of a welded mark formed to be swelled on the welded portion 14 and is enlarged toward the outer side in the radial direction as shown in FIG. 3B and FIG. 4A. In this case, the shape of the relief part 16 is not limited to a trapezoid shape and a semicircle shape may be used. When the relief part 16 is provided, a predetermined space of a dimension "A" is provided between the inner stator cores 9a and 9b and the terminal blocks 7a1 and 7b1 in the welded portion 14 as shown in FIG. 3B.

The relief part 16 is formed between a pair of protruded parts 9a3 and 9b3 which are protruded from outer peripheries of circular ring-shaped parts 9a2 and 9b2 of the inner stator cores 9a and 9b, and the welded portion 14 is located between a pair of the protruded parts 9a3 and 9b3. The outer peripheries of the circular ring-shaped parts 9a2 and 9b2 are provided, in addition to the protruded parts 9a3 and 9b3 protruding to the large cut-out parts 8a2 and 8b2 of the cases, with protruded parts 9a4 and 9b4 protruding to the small cut-out parts 8a3 and 8b3 of the cases and thus, the outer peripheries of the circular ring-shaped parts 9a2 and 9b2 are provided with a plurality of the protruded part 9a3, 9b3, 9a4 and 9b4. Further, the protruded parts 9a3 and 9b3 are provided with a pair of straight parts "D" structured to abut with the terminal blocks 7a1 and 7b1, and the protruded parts 9a3 and 9b3 are provided with straight parts "E" where the welded portion 14 is provided. The relief part 16 is recessed to an inner side in the radial direction with respect to the protruded parts 9a3 and 9b3, the straight part "E" is located on an inner side in the radial direction with respect to a circle "F" indicated with a dotted line which is drawn by the outer peripheries of the circular ring-shaped parts 9a2 and 9b2, and the welded portion 14 is located at a position substantially equivalent to the circle "F" which is drawn by the outer peripheries of the circular ring-shaped parts 9a2 and 9b2.

The inner stator core 9a and the outer stator core 8a in the first stator assembly 51 are contacted with each other at a pair of contact portions "G" and "H" in the circumferential direction of the cut-out part 8a2 with a pair of the protruded parts 9a3, and at a pair of contact portions "I" and "J" in the circumferential direction of the cut-out part 8a3 with the protruded parts 9a4. The magnetic flux formed by the coil 6a flows between the inner stator core 9a and the outer stator core 8a through the contact portions "G", "H", "I" and "J". Further, the inner stator core 9b and the outer stator core 8b in the second stator assembly 52 are contacted with each other at a pair of contact portions "G" and "H" in the circumferential direction of the cut-out part 8b2 with a pair of the protruded parts 9b3, and at a pair of contact portions "I" and "J" in the circumferential direction of the cut-out part 8b3 with the protruded parts 9b4. The magnetic flux formed by the coil 6b flows between the inner stator core 9b and the outer stator core 8b through the contact portions "G", "H", "I" and "J".

(Structure of Rotor)

A rotation shaft 2 of the rotor 4 is extended in the motor axial line "L" direction, and a rotor magnet 3 made of a permanent magnet is fixed to the rotation shaft 2 at a position on the anti-output side "L2" with an adhesive. In this embodiment, the rotation shaft 2 is made of metal material such as stainless steel or brass and has conductivity. An outer peripheral face of the rotation shaft 2 on a side protruding from the stator 5 (output side "L1") is formed with a spiral groove 2a and structures a rotation-linear motion conversion mechanism together with a rack not shown. The rotor magnet 3 is a bond magnet which is structured so that magnet particles are blended in a binder made of polymer material.

The rotor magnet 3 is formed in a cylindrical shape which is structured of large diameter parts 3a and 3b provided on both sides in the motor axial line "L" direction and a small diameter part 3c provided at the center. The two large diameter parts 3a and 3b are provided at positions separated from each other in the motor axial line "L" direction, and an outer peripheral face of the large diameter part 3a faces the pole teeth 8a1 and 9a1 on an inner side in the radial direction of the outer stator core 8a and the inner stator core 9a of the first stator assembly 51 through a predetermined space therebetween. An outer peripheral face of the large diameter part 3b faces the pole teeth 8b1 and 9b1 on an inner side in the radial direction of the outer stator core 8b and the inner stator core 9b of the second stator assembly 52 through a predetermined space therebetween.

(Bearing Structure)

An end face on the output side "L1" of the outer stator core 8a structuring the first stator assembly 51 is fixed to a connecting plate part 21a of the plate 21 by welding or the like. The plate 21 is made of metal and has conductivity. A bearing mechanism on the output side "L1" which rotatably supports an end part 2b on the output side "L1" of the rotation shaft 2 in the motor axial line "L" direction and in the radial direction perpendicular to the motor axial line "L" direction is structured in a tip end side bent portion 21b of the plate 21. On the other hand, an end face on the anti-output side "L2" of the outer stator core 8b structuring the second stator assembly 52 is fixed with a disk-shaped bottom plate 22. A bearing holder 23 in a cylindrical tube shape which is made of sintered metal is fixed to a hole 22a provided in an end face on the anti-output side "L2" of the bottom plate 22 by welding or the like. A bearing mechanism on the anti-output side "L2" which rotatably supports an end part 2c on the anti-output side "L2" of the rotation shaft 2 in the motor axial line "L" direction and in the radial direction perpendicular to the motor axial line "L" direction is held on an inner side of the bearing holder 23 by utilizing the bearing holder 23. In this case, the bearing holder 23 may utilize a holder made of resin material.

The rotation shaft 2 is structured so as to be movable in the motor axial line "L" direction on an inner side of the bearing holder 23, and the rotation shaft 2 is urged toward the output side "L1" by an urging member 24 in plate spring shape which is disposed on the anti-output side "L2" with respect to the bearing holder 23. The urging member 24 is provided with an end plate part 24a which is overlapped with an anti-output side "L2" face of the bearing holder 23 and a side plate part 24b which is protruded toward the anti-output side "L2" from one side of the end plate part 24a. The end plate part 24a is formed with a cut-out part in a semicircular shape which is fitted to the small diameter part of the bearing holder 23, and the urging member 24 is fixed to the bottom plate 22 together with the bearing holder 23 by welding or the like in a state that the cut-out part of the end plate part 24a is fitted to the small diameter part of the bearing holder 23. A tip end of the end part 2c on the anti-output side "L2" of the rotation shaft 2 is abutted with an end face on the output side "L1" of the side plate part 24b, and the rotation shaft 2 is urged toward the output side "L1" by elasticity of the side plate part 24b. On the output side "L1", the above-mentioned bearing mechanism on the output side "L1" is structured which rotatably supports the end part 2b on the output side "L1" of the rotation shaft 2 in the motor axial line "L" direction and the radial direction. Therefore, the rotation shaft 2 is urged in the state that the end part 2b on the output side "L1" is abutted with the bearing mechanism on the output side "L1" and thus, when the rotation shaft 2 is rotated, rattling in the motor axial line "L" direction of the rotation shaft 2 is prevented.

(Operation and Effect)

According to the stepping motor 1 in this embodiment, a pair of the inner stator cores 9a and 9b located at a position close to each other in the two stator assemblies 51 and 52 is fixed at least at one position of the welded portion 14 in their outer peripheries. Further, the welded portion 14 is covered by at least one of the terminal blocks 7a1 and 7b1 provided in the bobbins 7a and 7b which structure the stator assemblies 51 and 52 in the two stator assemblies 51 and 52 on an outer side in the radial direction with a predetermined space therebeteween. Therefore, at least the welded portion 14 provided at one position and structured to fix a pair of the inner stator cores 9a and 9b to each other is prevented from coming into contact with a person or an object by the terminal block 7a1 or 7b1 which covers it on the outer side in the radial direction. Accordingly, there is no fear that a person or an object comes into contact with the welded mark of the fixed portion which is swelled by welding in at least the welded portion 14 and thus, the welded mark is not peeled off and the welding is not damaged. As a result, mutual fixing of a pair of the inner stator cores 9a and 9b is surely maintained at least at one position of the welded portion 14.

In the stepping motor 1 in this embodiment, the welded portion 14 is covered by a pair of the terminal blocks 7a1 and 7b1 and thus, an area of the welded portion 14 covered by the terminal blocks 7a1 and 7b1 is increased and a possibility that a person or an object comes into contact with the welded portion 14 is reduced.

Further, in the stepping motor 1 in this embodiment, the inner stator cores 9a and 9b are welded in the welded portions 14 and 15 located at plural positions of their outer peripheries and are fixed to each other and thus, the inner stator cores 9a and 9b are firmly fixed to each other and, even when an impact is applied to the stepping motor 1, the fixed portion of the inner stator cores 9a and 9b is not damaged easily.

Especially, in the stepping motor 1 in this embodiment, the welded portions 14 and 15 are located at positions point-symmetrical to each other with the motor axial line "L" as a center and thus, the inner stator cores 9a and 9b are firmly and efficiently fixed to each other at the fewer welded portions.

Further, in the stepping motor 1 in this embodiment, the relief part 16 is provided in the outer peripheries of a pair of the inner stator cores 9a and 9b which are welded each other in the welded portion 14 and thus, even when the welded mark is formed in a swelled shape in the welded portion 14, the welded mark is accommodated in a space formed by the relief part 16. Therefore, the terminal blocks 7a1 and 7b1 cover the welded portion 14 on an outer side in the radial direction and thus, the terminal blocks 7a1 and 7b1 surely function to prevent a person or an object from coming into contact with the welded portion 14.

Further, in this embodiment, a pair of the inner stator cores 9a and 9b to be welded is provided with the relief part 16. However, a space in which the welded portion 14 is accommodated and which is covered by the terminal blocks 7a1 and 7b1 with a predetermined space therebetween may be formed so that the terminal blocks 7a1 and 7b1 covering the welded portion 14 are provided with relief parts.

However, when the relief part 16 is provided in the terminal blocks 7a1 and 7b1 for covering the welded portion 14, the position providing the terminal blocks 7a1 and 7b1 is shifted to an outer side in the radial direction. On the other hand, protruding amounts of the terminal blocks 7a1 and 7b1 permitted to be projected to an outer side in the radial direction are limited due to restriction of an outer side dimension of the stepping motor 1. Therefore, the length "B" (see FIG. 3B) in the radial direction of the terminal blocks 7a1 and 7b1 is shortened and thus, it is difficult to secure a sufficient press-in margin "C" (see FIG. 3B) of the terminal pins 10, around which end parts of coil wires of the coils 6a and 6b are bound, to the terminal blocks 7a1 and 7b1. However, according to the stepping motor 1 in this embodiment in which the relief parts 16 are provided in a pair of the inner stator cores 9a and 9b to be welded, the relief parts 16 can be provided without shifting the positions of the terminal blocks 7a1 and 7b1 to an outer side in the radial direction. Therefore, without projecting the terminal blocks 7a1 and 7b1 to an outer side in the radial direction and, while securing the press-in margin "C" of the terminal pins 10 to the terminal blocks 7a1 and 7b1, a space in which the welded portion 14 is accommodated and which is covered by the terminal blocks 7a1 and 7b1 can be secured.

INDUSTRIAL APPLICABILITY

In the embodiment described above, the outer stator cores 8a and 8b structure a case. However, at least an embodiment of the present invention may be similarly applied to a stepping motor which is structured so that an outer stator core and an inner stator core are accommodated in a case which is separately provided from these stator cores. In this case, it is structured that opening parts similar to the opening parts 12 and 13 in the embodiment described above are formed in the case, and outer peripheries to be welded of stator cores close to each other of two stator assemblies are located in the opening parts and the terminal block covers one welded portion. Further, in the embodiment described above, the present invention is applied to a stepping motor. However, at least an embodiment of the present invention may be applied to a motor other than a stepping motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
a rotor comprising a rotation shaft and a rotor magnet held by the rotation shaft; and
a stator which faces the rotor magnet on an outer side in a radial direction;
wherein the stator comprises a first stator assembly and a second stator assembly, each stator assembly of the two stator assemblies comprising:
a coil which is wound around a tube-shaped body part of a bobbin comprising a terminal block; and
a first stator core and a second stator core, the first stator core and the second stator core being disposed on opposite sides of the coil in a motor axial line direction;
wherein the first stator core of the first stator assembly is provided to a first direction side of the coil of the first stator assembly in the motor axial line direction;
wherein the first stator core of the second stator assembly is provided to a second direction side of the coil of the second stator assembly in the motor axial line direction, the second direction being opposite to the first direction;
wherein the first stator core of the first stator assembly and the first stator core of the second stator assembly are welded together and fixed to each other in at least one welded portion on outer peripheries of the first stator core of the first stator assembly and the first stator core of the second stator assembly; and
wherein the welded portion is covered by the terminal block of one of the first stator assembly or the second stator assembly on an outer side in the radial direction with a predetermined space between the welded portion and the terminal block.

2. The motor according to claim 1, further comprising a relief part provided in one of:
the first stator core of the first stator assembly and the first stator core of the second stator assembly; and
the terminal block covering the welded portion;
wherein the relief part structures the predetermined space.

3. The motor according to claim 2, wherein the relief part is provided in the first stator core of the first stator assembly and the first stator core of the second stator assembly.

4. The motor according to claim 3, wherein the relief part is provided so that the outer peripheries of the first stator core of the first stator assembly and the first stator core of the second stator assembly are recessed deeper than a height of a welded mark of the welded portion in the radial direction.

5. The motor according to claim 1, wherein the welded portion is covered by the terminal block of the first stator assembly and the terminal assembly of the second stator assembly on the outer side in the radial direction with the predetermined space between the welded portion and the terminal blocks.

6. The motor according to claim 1, wherein the welded portion is provided at a plurality of positions of the outer peripheries of the first stator core of the first stator assembly and the first stator core of the second stator assembly.

7. The motor according to claim 6, wherein the welded portion is provided a first position of the outer peripheries of the first stator core of the first stator assembly and the first stator core of the second stator assembly covered by the terminal block, and a second position of the outer peripheries of the first stator core of the first stator assembly and the first stator core of the second stator assembly;
wherein the first position and the second position are point-symmetrical with the motor axial line as a center.

* * * * *